US007949564B1

(12) United States Patent
Hughes et al.

(10) Patent No.: US 7,949,564 B1
(45) Date of Patent: May 24, 2011

(54) SYSTEM AND METHOD OF RECEIVING ADVERTISEMENT CONTENT FROM ADVERTISERS AND DISTRIBUTING THE ADVERTISING CONTENT TO A NETWORK OF PERSONAL COMPUTERS

(75) Inventors: Scott T. Hughes, Laguna Beach, CA (US); Matthew W. Milne, Chino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 2429 days.

(21) Appl. No.: 09/585,129

(22) Filed: May 31, 2000

(51) Int. Cl.
*G06Q 99/00* (2006.01)

(52) U.S. Cl. ..................................... 705/14.49

(58) Field of Classification Search .............. 705/14, 705/27, 411, 50–79
See application file for complete search history.

(56) References Cited

U.S. PATENT DOCUMENTS

| | | | | |
|---|---|---|---|---|
| 5,045,994 A * | 9/1991 | Belfer et al. ..................... 703/25 |
| 5,091,878 A * | 2/1992 | Nagasawa et al. ............ 715/210 |
| 5,202,828 A * | 4/1993 | Vertelney et al. ............. 715/236 |
| 5,579,466 A * | 11/1996 | Habib et al. ................... 715/210 |
| 5,604,873 A | 2/1997 | Fite et al. |
| 5,654,905 A | 8/1997 | Mulholland et al. |
| 5,696,701 A | 12/1997 | Burgess et al. |
| 5,710,884 A * | 1/1998 | Dedrick ......................... 709/217 |
| 5,717,923 A * | 2/1998 | Dedrick ................................ 1/1 |
| 5,724,521 A * | 3/1998 | Dedrick ........................... 705/26 |
| 5,740,549 A * | 4/1998 | Reilly et al. ............... 705/14.42 |
| 5,754,242 A * | 5/1998 | Ohkami ........................ 348/441 |
| 5,875,349 A | 2/1999 | Cornaby et al. |
| 5,913,040 A | 6/1999 | Rakavy et al. |
| 5,915,243 A * | 6/1999 | Smolen ....................... 705/14.19 |
| 5,948,061 A * | 9/1999 | Merriman et al. ............ 709/219 |
| 5,960,411 A | 9/1999 | Hartman et al. |
| 5,974,451 A * | 10/1999 | Simmons ....................... 709/218 |
| 5,974,547 A | 10/1999 | Klimenko et al. |
| 6,005,561 A | 12/1999 | Hawkins et al. |
| 6,047,327 A | 4/2000 | Tso et al. |
| 6,058,418 A | 5/2000 | Kobata |
| 6,119,162 A | 9/2000 | Li et al. |
| 6,141,010 A * | 10/2000 | Hoyle .......................... 707/501.1 |
| 6,167,567 A | 12/2000 | Chiles et al. |
| 6,170,014 B1 | 1/2001 | Darago et al. |
| 6,205,432 B1 * | 3/2001 | Gabbard et al. ................ 705/14 |
| 6,216,112 B1 * | 4/2001 | Fuller et al. ..................... 705/14 |
| 6,300,947 B1 * | 10/2001 | Kanevsky ...................... 715/866 |
| 6,313,732 B1 * | 11/2001 | DeLuca et al. ................. 340/7.2 |
| 6,339,761 B1 * | 1/2002 | Cottingham .................... 705/14 |
| 6,345,294 B1 | 2/2002 | O'Toole et al. |
| 6,353,848 B1 | 3/2002 | Morris |

(Continued)

OTHER PUBLICATIONS

White, "How Computers Work", Millennium Edition, 1999, Que Corporation, Indianapolis, IN, all pages.*

(Continued)

*Primary Examiner* — Andrew J. Fischer
*Assistant Examiner* — Jacob C. Coppola (57) ABSTRACT

A method of distributing advertisement content. One embodiment of the invention comprises a distribution server that is connected to a network of personal computers via a network. The distribution server receives advertising data from advertisers and formats the advertisement data for storage and display on the personal computers during or before bootloading a user selected application environment. Upon the occurrence of one or more events, the distribution server distributes the advertisement data to the network of personal computers. The personal computers receive the distributed advertisement content and store the advertisement data on a storage device. Upon the bootloading of the user selected application environment, the advertising data is displayed to the user.

7 Claims, 6 Drawing Sheets

U.S. PATENT DOCUMENTS

| | | | |
|---|---|---|---|
| 6,373,498 B1 * | 4/2002 | Abgrall | 345/619 |
| 6,393,407 B1 * | 5/2002 | Middleton, III et al. | 705/14 |
| 6,401,202 B1 * | 6/2002 | Abgrall | 713/2 |
| 6,473,855 B1 | 10/2002 | Welder | |
| 6,487,601 B1 | 11/2002 | Hubacher et al. | |
| 6,502,194 B1 | 12/2002 | Berman et al. | |
| 6,516,338 B1 | 2/2003 | Landsman et al. | |
| 6,529,949 B1 | 3/2003 | Getsin et al. | |
| 6,546,489 B1 | 4/2003 | Frank, Jr. et al. | |
| 6,578,142 B1 * | 6/2003 | Anderson et al. | 713/2 |
| 6,594,682 B2 | 7/2003 | Peterson et al. | |
| 6,609,127 B1 | 8/2003 | Lee et al. | |
| 6,678,741 B1 | 1/2004 | Northcutt et al. | |
| 6,816,920 B2 * | 11/2004 | Hobby et al. | 710/15 |
| 6,973,495 B1 | 12/2005 | Milne et al. | |
| 6,983,316 B1 | 1/2006 | Milne et al. | |
| 7,054,937 B1 | 5/2006 | Milne et al. | |
| 7,150,036 B1 | 12/2006 | Milne et al. | |
| 2001/0034643 A1 * | 10/2001 | Acres | 705/14 |
| 2001/0047297 A1 * | 11/2001 | Wen | 705/14 |
| 2001/0049620 A1 * | 12/2001 | Blasko | 705/10 |
| 2001/0049701 A1 * | 12/2001 | Howerton et al. | 707/513 |
| 2002/0013167 A1 * | 1/2002 | Spaur et al. | 463/11 |
| 2002/0016736 A1 * | 2/2002 | Cannon et al. | 705/14 |
| 2002/0062481 A1 * | 5/2002 | Slaney et al. | 725/42 |
| 2002/0072965 A1 * | 6/2002 | Merriman et al. | 705/14 |
| 2002/0073305 A1 * | 6/2002 | Joseph et al. | 713/1 |
| 2002/0165773 A1 * | 11/2002 | Natsuno et al. | 705/14 |

OTHER PUBLICATIONS

Derfler, "How Networks Work", Bestseller Edition, 1996, Ziff-Davis Press, Emeryville, CA, all pages.*

Gralla, "How the Internet Works", Millennium Edition, 1999, Que Corporation, Indianapolis, IN, all pages.*

Muller, "Desktop Encyclopedia of the Internet", 1999, Artech House Inc., Norwood, MA, all pages.*

Heck, Mike, "Kontiki Optimizes Delivery", InfoWorld, Dec. 2003, pp. 32-33.

Waller et al., "Securing the delivery of digital content over the Internet", Oct. 2002, Electronics & Communication Engineering Journal, pp. 239-248.

Office Action dated Oct. 27, 2003, U.S. Appl. No. 09/618,767, 9 pages.

Office Action dated Jan. 4, 2005, U.S. Appl. No. 09/618,767, 8 pages.

Office Action dated Jan. 28, 2004, U.S. Appl. No. 09/618,209, 15 pages.

Office Action dated Sep. 23, 2004, U.S. Appl. No. 09/618,209, 16 pages.

Office Action dated May 16, 2005, U.S. Appl. No. 09/618,209, 15 pages.

Office Action dated Aug. 13, 2003, U.S. Appl. No. 09/618,766, 9 pages.

Office Action dated Feb. 4, 2004, U.S. Appl. No. 09/618,766, 10 pages.

Office Action dated Sep. 20, 2004, U.S. Appl. No. 09/618,766, 10 pages.

Office Action dated Oct. 22, 2003, U.S. Appl. No. 09/618,765, 8 pages.

Office Action dated Nov. 29, 2005 from U.S. Appl. No. 09/618,209, 6 pages.

Notice of Allowance dated May 31, 2006 from U.S. Appl. No. 09/618,209, 8 pages.

Notice of Allowance dated Feb. 14, 2005 from U.S. Appl. No. 09/618,766, 8 pages.

Notice of Allowance dated Sep. 2, 2005 from U.S. Appl. No. 09/618,766, 5 pages.

Notice of Allowance dated Jun. 30, 2004 from U.S. Appl. No. 09/618,765, 5 pages.

Notice of Allowance dated Jun. 28, 2005 from U.S. Appl. No. 09/618,765, 6 pages.

Supplemental Notice of Allowance dated Jul. 18, 2005 from U.S. Appl. No. 09/618,765, 4 pages.

Notice of Allowance dated Apr. 22, 2005 from U.S. Appl. No. 09/618,767, 8 pages.

Supplemental Notice of Allowance dated May 20, 2005 from U.S. Appl. No. 09/618,767, 4 pages.

Notice of Allowability dated Jul. 25, 2005 from U.S. Appl. No. 09/618,767, 3 pages.

Notice of Allowance dated Aug. 26, 2005 from U.S. Appl. No. 09/618,767, 5 pages.

* cited by examiner

SYSTEM AND METHOD OF RECEIVING ADVERTISEMENT CONTENT FROM ADVERTISERS AND DISTRIBUTING THE ADVERTISING CONTENT TO A NETWORK OF PERSONAL COMPUTERS

BACKGROUND OF THE INVENTION

1. Field of the Invention

The field of the invention relates generally to advertising, and more particularly for distributing advertising content to a network of personal computers.

2. Background Information

With the marked increase in the number of personal computers that are being used by the general populace for business and home activities, the use of personal computers as an advertising medium has become a burgeoning field. Using the Internet, a company can maintain a website whereby users can directly download and view advertising materials on their personal computer. However, one disadvantage of advertising on the Internet is that users need to know about the existence of a company's website. In this regard, the company needs to advertise its website or rely on search engines to provide to the user the Internet address of the user's company. Furthermore, to access the website the user needs to take an affirmative step and "navigate" to the web site. The term navigate is often referred to as the process of accessing a selected web page on the Internet. Disadvantageously, if the user never navigates to the company's website, the company is never given the opportunity to display its advertisements.

Another approach to providing advertisements via a computing environment is described in U.S. Pat. No. 5,913,040, to Rakavy, et al. Rakavy describes an advertising system wherein advertisement data is periodically transmitted to a client computer. In Rakavy, advertisement data is displayed to a user during idle times of the computer such as when the computer is not receiving keyboard input or when the computer has not refreshed the screen for a predetermined period of time. Disadvantageously, in Rakavy, if a user actively uses his computer, the advertisement data is never displayed to the user.

Thus, there is a need for an improved advertisement system and method for displaying advertisements. The system and method should not require individuals to navigate to a web site before the user is able to view advertising materials. Furthermore, the system and method should be able to guarantee to advertisers that their advertisers will be displayed to a user of the computing environment, regardless of the user's actions.

SUMMARY OF THE INVENTION

One embodiment of the invention comprises a method of operating a content delivery system for distributing advertising content to users of personal computers. The method comprises collecting identification data from a network of personal computers, wherein the personal computers are configured to periodically receive and store advertising content and display the advertising content while or before bootloading a user selected application environment. After receiving advertising content from an advertiser, the advertisement content is formatted for storage and display in the personal computers. The formatted advertising content is then, using the collected identification data, distributed to the personal computers.

Another embodiment of the invention comprises a content delivery system for distributing advertising data to a network of personal computers. The content delivery system comprises: (i) an identification database comprising identification data, wherein the identification data uniquely identifies a computer or a user in the network of personal computers and (ii) an advertisement database comprising advertising data, wherein the advertising data is formatted for storage and display in the network of personal computers while or before bootloading a selected application environment. A collection module collects the identification from the network of personal computers and stores the collection information in the identification database. A formatting module formats and stores advertisement data in the advertisement database. Furthermore, a control module distributes the formatted advertising data to the network of personal computers upon the occurrence of one or more events.

DETAILED DESCRIPTION OF EMBODIMENTS OF THE INVENTION

Figure 1:
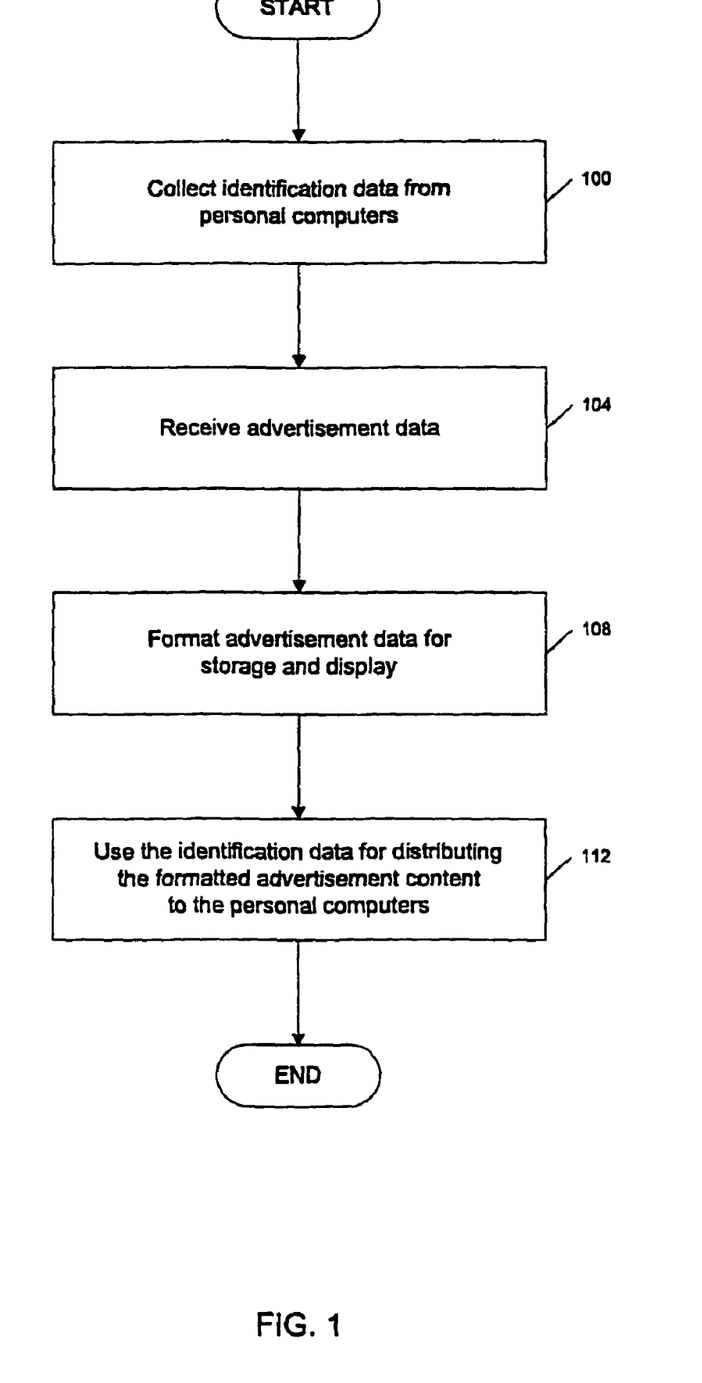
FIG. 1 is a flowchart illustrating an exemplary process for distributing advertisement content.
Figure 2:
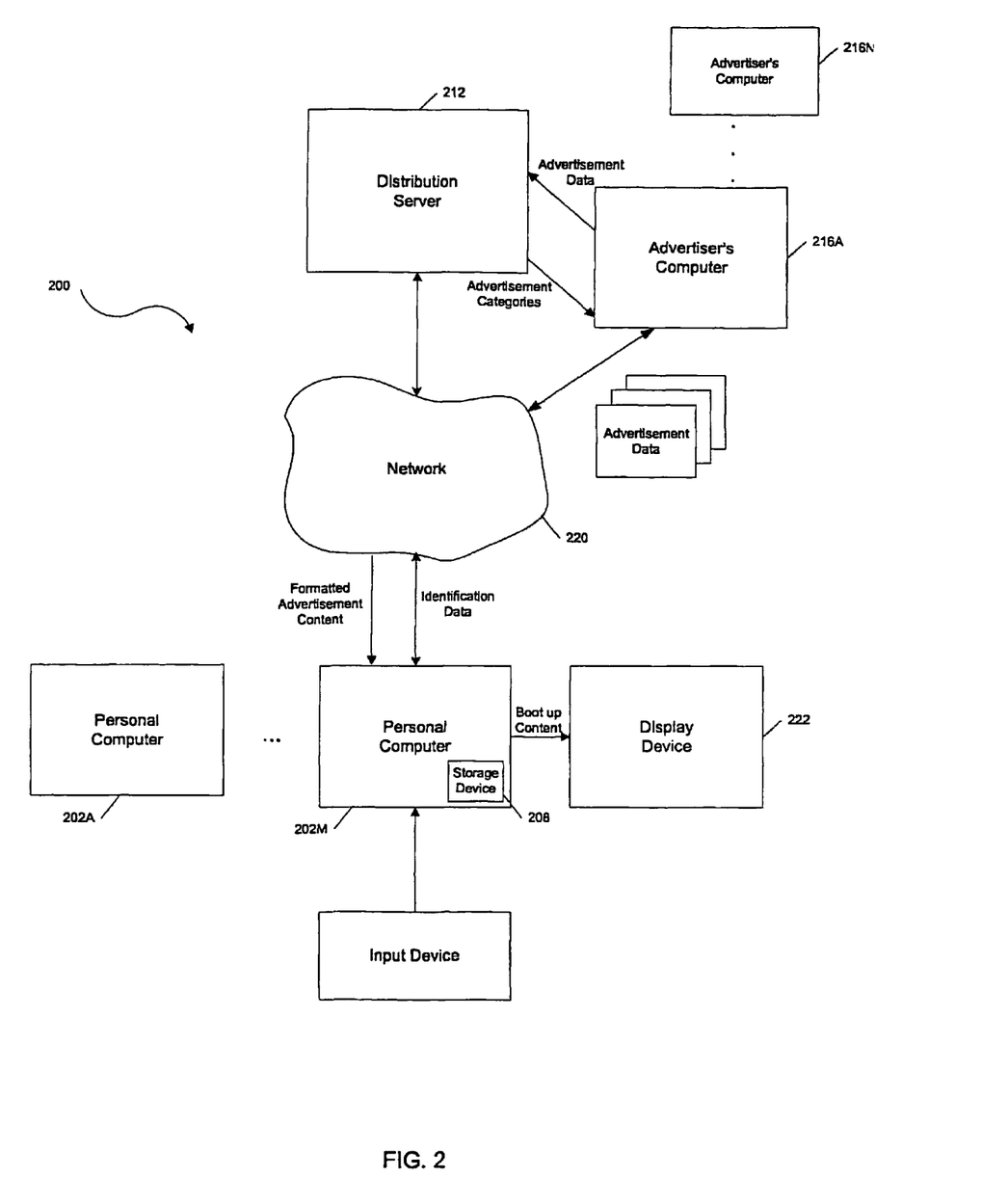
FIG. 2 is a block diagram illustrating an exemplary system for distributing advertisement content.

FIG. 1 is a flowchart illustrating an exemplary process for distributing advertisement content. Starting at a step 100, a content delivery system 200 (FIG. 2) receives identification information from a network of personal computers 202A-202M (FIG. 2). In one embodiment of the invention, the identification information is a unique number that uniquely identifies a user, or alternatively, identifies a component of the user's computer. For example, the identifier can be any type of data, such as: (i) a serial number in a storage device 208, (ii) a serial number associated with a central processing unit, (iii) a unique number that is provided by a distribution server 212, (iv) an Internet protocol address or (v) a user's name.

Figure 3:
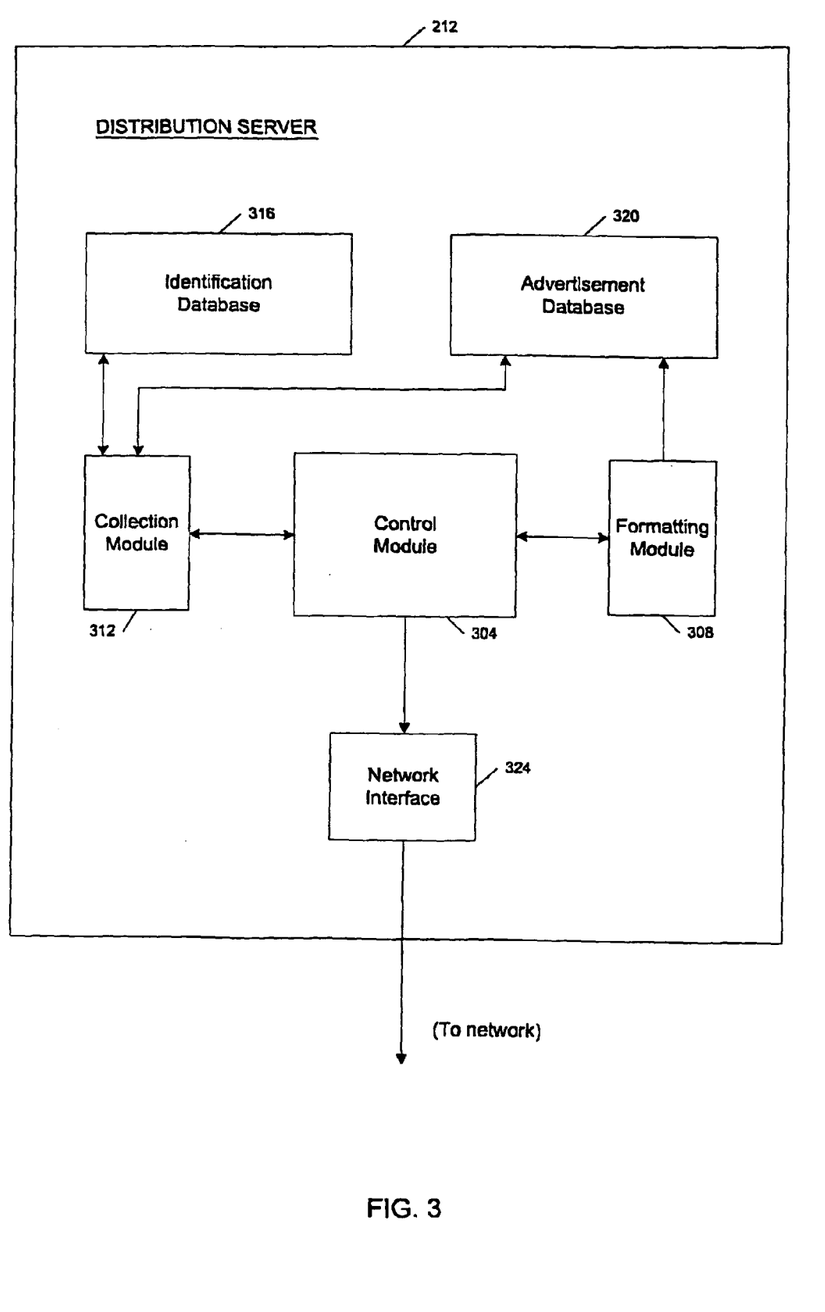
FIG. 3 is a block diagram illustrating certain modules that, in one embodiment, are contained in the distribution server shown in FIG. 2.

At the step 100, in one embodiment of the invention, the identification data is stored in an identification database 300 in the distribution server 212. The identification data is used by the content delivery system 200 to determine which of the personal computers 202A-202M will receive advertising information.

Next, at a step 104, the content delivery system 200 receives advertisement data. The advertisement data can include: movie trailers, upgrade offers, software offers, commodities, ads for tangible goods, ads for services, etc. The advertisement data can be in any type of proprietary, commercial, or publicly available data format. For example, the format can include: a HyperText Markup Layout (HTML) page, a JPEG file, an animated GIF file, textual information, a movie, an audio file, or a flash animation.

In one embodiment of the invention, the advertisement data is transmitted from advertiser computers 216A-216N to the distribution server 212 via a network 220. In this embodiment, the advertising data may be transmitted from a selected advertiser computer 216A in response to a request from the distribution server 212. In this embodiment, the distribution server 212 provides the selected advertiser computer an advertisement category. As non-limiting examples, the advertisement categories can include: sports, comedy, drama, hobby, games, television, news, and movies. In response to the receiving the advertisement category, the selected advertisement computer transmits an advertisement to the distribution server 212. The transmitted advertisement is based at least in part upon the user provided information. The user provided information can include: a category of information, the name of a selected user, the geographic location of the selected user, the geographic location of a group of users, or one or more preferences of the user. For example, if the provided category is "sports", the selected advertisement computer can provide advertisement data that relates to sports.

Furthermore, still referring to the step 104, in another embodiment of the invention, the advertisement data may be manually transmitted via a data storage device to a business entity ("the distribution company") that maintains the distribution server 212. In this embodiment, the distribution company stores the advertisement data on the distribution server 212 using an input device that is associated with the distribution server 212.

Figure 7:
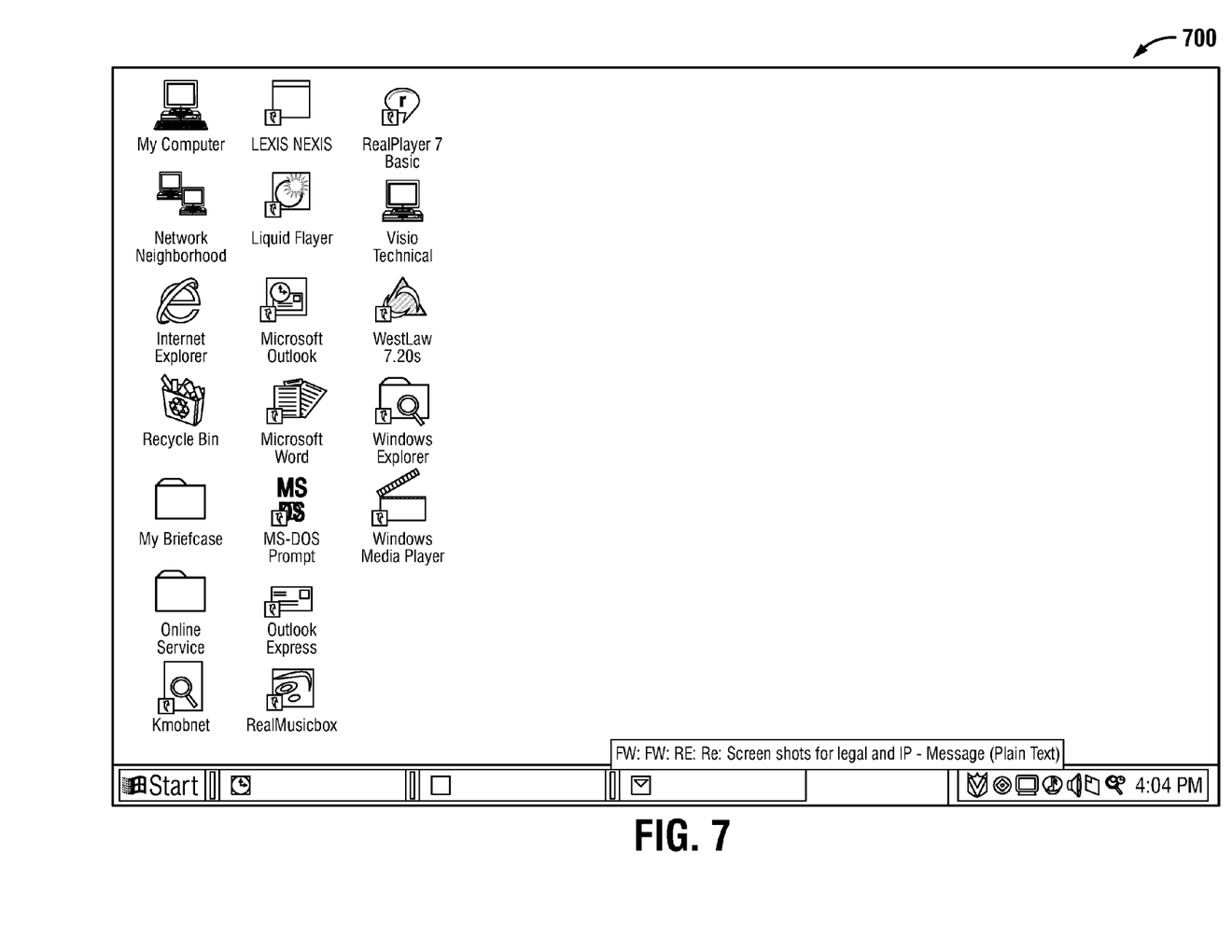
FIG. 7 is an exemplary screen display showing an exemplary user selected application environment.

Next, at a step 108, the advertisement data is formatted for display at the personal computers while or before the bootloading of a user selected application environment. FIG. 7 illustrates a graphical interface that is associated with an exemplary user selected application environment. The advertising data is then stored into an advertisement database 320. In one embodiment of the invention, the bootloading process is divided into several purchasable time slots. In this embodiment, the advertisement data is formatted to be displayed in a selected one of the time slots.

Continuing to a step 112, the distribution server 112 uses the identification information (collected at the state 100) to transmit the formatted advertisement content to the personal computers 202A-202M. Once received by the personal computers 202A-202M, the advertisement data is stored on a storage device 208 that is associated with each of the personal computers 212. In one embodiment of the invention, the storage device 208 is a mass storage device, such as is manufactured by Western Digital Inc. of Irvine Calif.

During or before the bootloading of a user selected application environment on the personal computers 202A-202M, the advertisement data is displayed to the user via a visual display device 222. As defined herein, bootloading of a user selected application environment comprises executing one or more programs to configure a personal computer to a state wherein the personal computer can execute an application program specified by the user after boot up.

The advertisement data is distributed by the distribution server 212 to the personal computers 202A-202M upon the occurrence of one or more customizable conditions. The conditions can include: the expiration of a user defined timer, entering a time window(s) provided by a user of the personal computers 202A-202M, low activity on the personal computers, the expiration of a time threshold that is set by a scheduling algorithm that is executing on the distribution server 212, and upon receiving new advertisement data in the distribution server 212.

FIG. 2 is a block diagram illustrating an exemplary content delivery system 200. The content delivery system comprises a distribution server 212 that is operably connected to personal computers 202A-202M via a network 220.

The personal computers 202A-202M, the distribution server 212, and the advertisement computers 216A-216N may each have one or more conventional general purpose microprocessors such as a Pentium® processor, a Pentium® Pro processor, a 8051 processor, a MPS® processor, a Power PC® processor, or an ALPHA® processor. In addition, the microprocessor may be any conventional special purpose microprocessor such as a digital signal processor or a graphics processor. Furthermore, the personal computers 202A-202M, the distribution server 212, and the advertisement computer 216A-216N may each comprise a plurality of computers that are connected by a network, such as the network 108. In addition, the personal computers 202A-202M, the distribution server 212, and the advertisement computers 216A-216N may be a desktop, server, portable, hand-held, set-top, or other configured computer.

The personal computers 202A-202M, the distribution server 212, and the advertisement computers 216A-216N may each be used in connection with various operating systems such as: UNIX, LINUX, Disk Operating System (DOS), OS/2, Windows 3.X, Windows 95, Windows 98, and Windows NT.

The network 220 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). As used herein, an Internet includes network variations such as public internet, a private internet, a secure internet, a private network, a public network, a value-added network, an intranet, and the like. The network 220 may include multiple network technologies including both high and low bandwidth connections. The network 220 may include non-persistent connections that are only available at intervals, e.g., dial up telephone lines, and may also include persistent connections.

Each of the personal computers 202A-202M, the distribution server 212, and the advertisement computers 216A-216N may have one or more input and output devices associated with the computers. For example, the input device may be a keyboard, rollerball, pen and stylus, mouse, or voice recognition system. The input device may also be a touch screen associated with an output device. The user may respond to prompts on the display by touching the screen. The user may enter Textual or graphic information through the input device. Furthermore, for example, the output device can comprise a display screen, a printer, or a voice synthesizer.

FIG. 3 is a block diagram illustrating certain modules that are contained in one embodiment of the distribution server 212 shown in FIG. 2. The distribution server 212 comprises a control module 304 that is in operable communication with a formatting module 308, a collection module 312, an identification database 316, and an advertisement database 320.

The control module 304, the formatting module 308, the collection module 312, the identification database 316, and the advertisement database 320 comprise executable code that may contain procedures, definitional statements, and macros. As will be appreciated by one of ordinary skill in the art, each of the foregoing modules and databases can be divided into several components which are linked together, or made available in a shareable dynamic link library. Furthermore, the modules and databases may be written in any programming language such as C, C++, BASIC, Pascal, Java, and FORTRAN. C, C++, BASIC, Pascal, Java, and FORTRAN are industry standard programming languages for which many commercial compilers can be used to create executable code.

The control module 304 controls the operation of the distribution server 212. In response to receiving advertisement data, the control module 304 transmits the advertisement data to the formatting module 308. The formatting module 308 formats the advertisement data for storage and display at the user computers during or before the bootloading of a user selection application environment on the personal computers 202A-202M. Once formatted, the formatting module 308 stores the formatted information in the advertisement database 320.

In response to receiving identification data from the personal computer 202A-202M, the control module 304 transmits the identification data to the collection module 312. The collection module 312 stores the information in an identification database 316. Furthermore, in one embodiment, the identification database 316 comprises user provided demographic and preference information. For example, the demographic information can include: the name of a user, the age of a user, etc. The preference information can include one or more types of information that is enjoyed by the user. For example, the preference information can include: movies, music sports, games, news, television, etc.

The network interface 324 transmits information between the network 220 and the control module 304. For example, the network interface transmits advertisement data to the client computers 212A-212M via the network 220.

Figure 4:
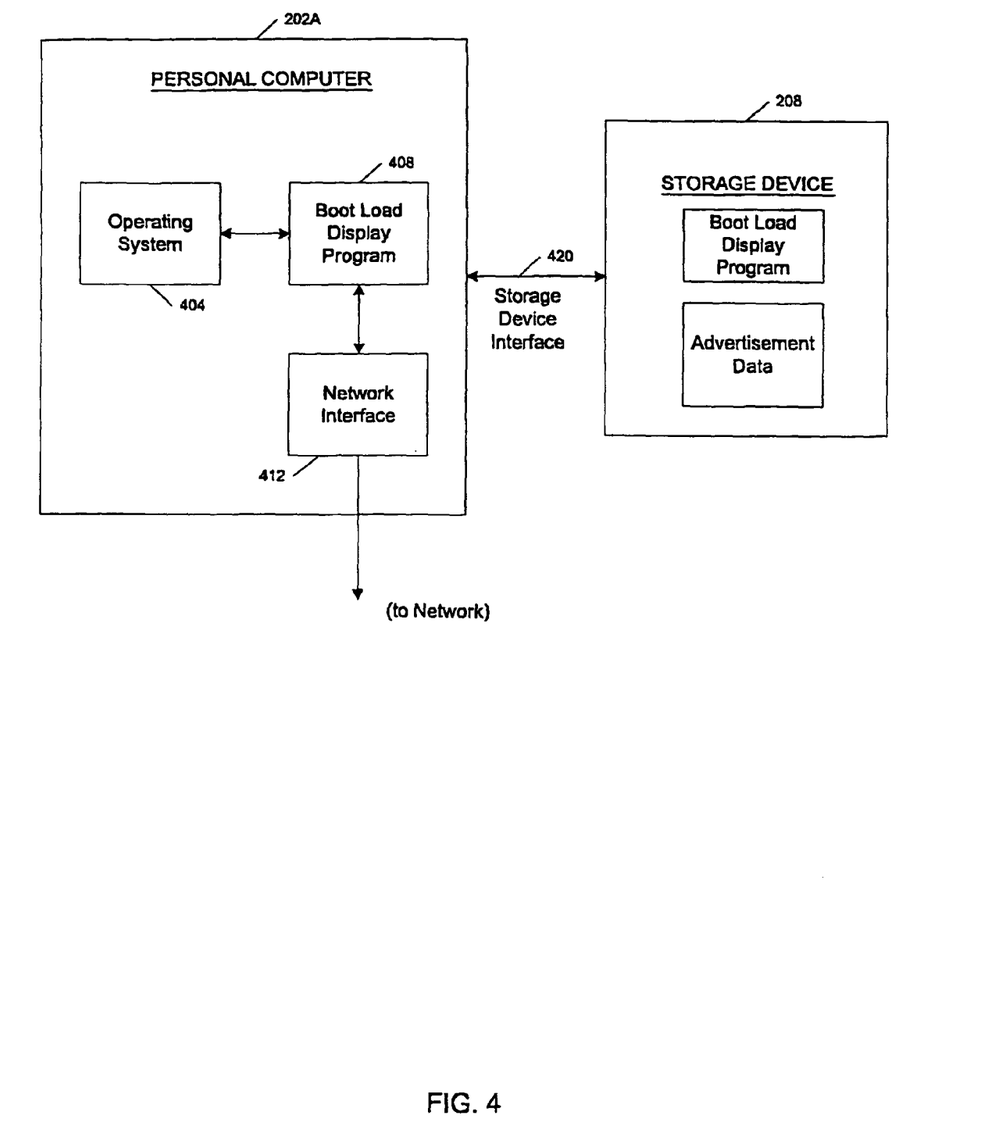
FIG. 4 is a block diagram illustrating certain modules that, in one embodiment, are contained in each of the personal computers shown in FIG. 2.

FIG. 4 is a block diagram illustrating certain modules that are contained in one embodiment of the personal computer 202A shown in FIG. 2. The personal computer comprises an operating system 404, a bootload display program 408, and a network interface 412. During the bootloading of a user selected application environment, a boot load display program 408 retrieves advertisement data that is stored on the storage device 208 and displays the advertisement data on the display device for the personal computer 202A. In one embodiment of the invention, the advertisement data is transmitted by from the distribution server 212 to the personal computer 202A via the system that is described in U.S. Pat. No. 5,913,040 to Rakavy, et al. In this regard, U.S. Pat. No. 5,913,040 is incorporated by reference, in its entirety.

The bootload display program 408 and the network interface 412 comprise executable code that may contain procedures, definitional statements, and macros. As will be appreciated by one of ordinary skill in the art, each of the foregoing modules can be divided into several components which are linked together, or made available in a shareable dynamic link library. Furthermore, the modules may be written in any programming language such as C, C++, BASIC, Pascal, Java, and FORTRAN. In addition, depending on the embodiment, the bootload display program and the network interface can be incorporated into the operating system 404, execute in application space as an application program, or reside partly in both.

In one embodiment of the invention, the bootload display program 408 is stored on the storage device 208 during the manufacture of the storage device 208. In this embodiment, when a user installs the storage device 208 using installation software, the bootload display program is installed to execute on the personal computer during the bootloading of a user selected application environment.

In one embodiment, the personal computer 202A communicates with the storage device via a storage device interface. The storage device interface can be any standard or propriety storage interface. For example, the storage device interface can be an Intelligent Drive Electronics (IDE) or AT Attachment (ATA) interface.

Upon the occurrence of selected conditions, the personal computer 202A receives advertisement data via the network interface 412 from the distribution server 212. Once received, the advertisement data is stored on the storage device 208.

Figure 5:
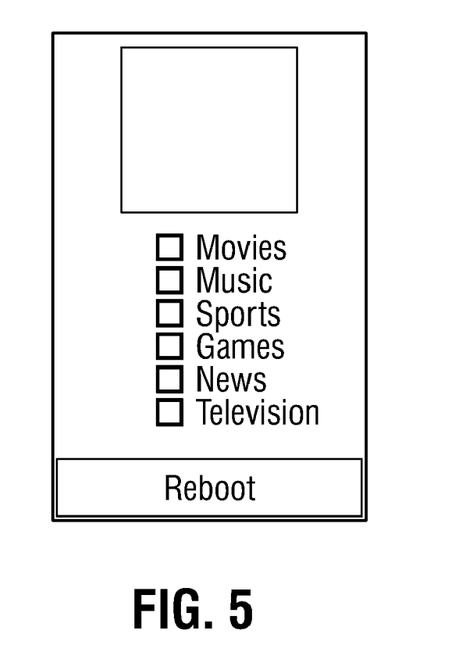
FIG. 5 is a screen display illustrating an exemplary preference menu that is presented to the user of the personal computers shown in FIG. 2.

FIG. 5 is a screen display illustrating an exemplary set of preferences that may be selected by users of the personal computers 202A-202M. As is shown in FIG. 5, six selectable categories are shown, namely: movies, music, sports, games, news, and television. A user may select one or more of the categories to identify types of information that the user finds enjoyable. Once selected via an input device of the personal computer 202A, the personal computer 202A transmit the preference information to the distribution server 212. In one embodiment, the distribution server 212 uses the preference information to determine which advertisements are to be sent to the user.

Figure 6:
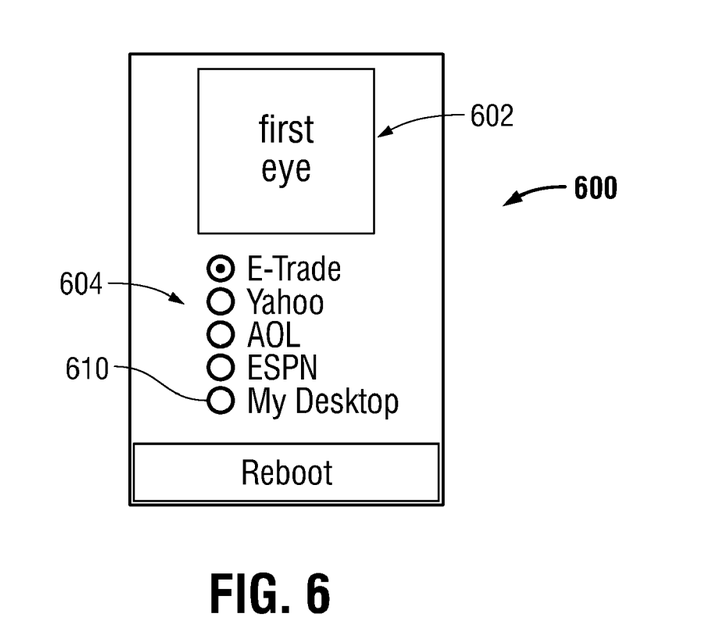
FIG. 6 is a screen display illustrating an exemplary advertisement that is presented to the user of the personal computer shown in FIG. 2.

FIG. 6 is a screen display 600 illustrating an exemplary set of advertising data that may be presented to a user during the bootloading of a user selected application environment. The screen display 600 is shown for illustrative purposes. It should be appreciated that the content and the layout of the can be modified by the distribution server 212.

The screen display 600 comprises an advertisement area 602 that comprises an advertisement "first eye." Furthermore, the screen display 600 comprises an advertiser checklist 604 that lists various advertisers. As is shown in FIG. 6, the advertisers include E-Trade, Yahoo, AOL, and ESPN. A user can select one of the advertisers to receive further information about the selected advertiser. In one embodiment, upon selecting the advertiser, an Internet browser is executed which allows the user to view a website that is maintained by the advertiser. Furthermore, the screen display 600 comprises a selector 610. By selecting the selector 610, a user can request to end the displaying of the advertising data and finish bootloading the user selected application environment.

FIG. 7 illustrates a graphical interface 700 that is associated with an exemplary user selected application environment. In the user selected application environment, the user may request to execute one or more applications under of the control operating system 404. It is to be appreciated by one of ordinary skill in the art that other user selected application environments may be used in connection with the present invention.

Advantageously, advertisement data may be presented to a user during a period in which the user normally receives sterile information regarding the boot process. Typically, during the boot process, a user performs non-computer related activities, or alternatively, stares blankly at the screen. Using the present invention, advertisers can display advertisement content to a user while the bootloading process is occurring. In many instances, the boot process is repeated daily and represents a significant opportunity for presenting advertising which can be informative and entertaining during an otherwise unproductive time span.

What is claimed is:

1. A method of operating a content delivery system implemented by a server computer for distributing advertising content to a plurality of personal computers, including a first and a second personal computer, the method comprising:

collecting identification data from each of the plurality of personal computers via a network, wherein each of the plurality of personal computers are configured to periodically receive and store advertisements while or before bootloading a user selected application environment;

receiving an advertising content from an advertiser, the advertising content including a plurality of advertisements;

receiving preference data from each of the plurality of personal computers, wherein the preference data of the first personal computer and the second personal computer are selected by a first user of the first personal computer and a second user of the second personal computer, respectively;

selecting a first advertisement from the advertising content to be distributed to the first personal computer and a second advertisement from the advertising content to be distributed to the second personal computer, wherein the first and second advertisements are selected based upon the received preference data from the first and second personal computers, respectively, and pre-determined conditions related to advertisement distribution;

formatting the first and second advertisements for storage and display in the first and second personal computers, respectively, while or before bootloading the user selected application environment, wherein a time frame occurs while or before bootloading and is divided into a plurality of time slots; and distributing, using the collected identification data, the formatted first and second advertisements to the first and second personal computers, respectively, wherein the first and second personal computers are programmed to display the first and second advertisements, respectively, during one of the plurality of time slots, the one of the plurality of time slots having been purchased by the advertiser; and associating a fee with data representative of the advertiser.

2. The method of claim 1, wherein the identification data comprises a unique identifier that is associated with each of the plurality of personal computers.

3. The method of claim 1, wherein the identification data comprises an internet protocol address that is associated with each of the plurality of personal computers.

4. The method of claim 1, additionally comprising storing the fee in a storage device.

5. A content delivery system comprising:
a network of a plurality of personal computers, wherein at least one personal computer of the plurality of personal computers is programmed to display a first advertisement during one of a plurality of time slots, the one of the plurality of time slots having been purchased by an advertiser;

a server computer comprising:
an identification database comprising identification data, wherein the identification data uniquely identifies a computer or a user in the network of the plurality of personal computers;

an advertisement database comprising advertising data, wherein the advertising data is formatted for storage and display in the network of the plurality of personal computers while or before each of the plurality of personal computers bootloads a selected application environment, and wherein the advertising data includes a plurality of advertisements;

a collection module programmed to collect the identification from the network of the plurality of personal computers and store the collection information in the identification database;

a formatting module programmed to format and store the advertising data in the advertisement database, wherein the advertising data is formatted by the formatting module for storage and display in the personal computers while or before bootloading the user selected application environment, wherein a time frame occurs while or before bootloading and is divided into the plurality of time slots; and a control module programmed to:
receive preference data from each of the personal computers, wherein the preference data is selected by a respective user of each of the plurality of personal computers;

select the first advertisement from the advertising data to be distributed to the at least one personal computer of the plurality of personal computers based upon the received preference data from the at least one personal computer of the plurality of personal computers and pre-determined conditions related to advertisement distribution;

distribute the formatted first advertisement to the at least one personal computer of the plurality of personal computers via the network; and associate a fee with data representative of the advertiser.

6. The system of claim 1, wherein the identification data comprises a unique identifier that is associated with each of the plurality of personal computers.

7. The system of claim 1, wherein the identification data comprises an internet protocol address associated with each of the plurality of personal computers.

* * * * *